3,567,625
HYDROFORMING WITH PROMOTED IRIDIUM CATALYST

John H. Sinfelt, Berkeley Heights, and Allan E. Barnett, Westfield, N.J., assignors to Esso Research and Engineering Company
No Drawing. Filed Feb. 6, 1969, Ser. No. 797,234
Int. Cl. C10g 35/06, 35/08
U.S. Cl. 208—138
12 Claims

ABSTRACT OF THE DISCLOSURE

The use, in a hydroforming process, of a catalyst comprising iridium and a metal selected from the group consisting of gold, copper or silver, supported on a high surface area support results in the production of an improved hydroformate.

FIELD OF THE INVENTION

This invention pertains to the catalytic conversion of hydrocarbons. More particularly, the invention pertains to the hydroforming of hydrocarbon fractions boiling within the motor fuel or naphtha range. More particularly still, this invention pertains to a method of hydroforming in which the conversion of paraffins to aromatics is maximized. This superior conversion is reflected in a substantial improvement in the research octane number of the naphtha.

The improvement is effected by contacting the naphtha, under reaction conditions and in the presence of a reducing atmosphere, such as hydrogen, with a catalyst comprising iridium and a metal selected from the group consisting of gold, copper and silver impregnated onto a high surface area support. The preferred catalyst composition is iridium-gold on a high surface area support. Typical of these supports is alumina which has a surface area of about 50 to 300 $M^2$/gram; the minimum surface area for the support is about 30 $M^2$/gram.

Hydroforming is now a matter of record and commercial practice in this country. Basically, the operation involves the contacting of a naphtha, either virgin, cracked, Fischer-Tropsch or mixtures thereof, with a solid catalytic material. The process itself produces substantial amounts of hydrogen and, in actuality, this is the source of the hydrogen which is recycled to repress deactivation of the catalyst by carbon formation.

The reactions involved in hydroforming are:

(1) Dehydrogenation of naphthenes to the corresponding aromatic hydrocarbons as where methylcyclohexane is dehydrogenated to form toluene;

(2) Isomerization of normal paraffins to form branched-chain paraffins or isomerization of ring compounds, such as ethylcyclopentane to form methylcyclohexane, which latter compound is then dehydrogenated to form toluene;

(3) Hydrocracking of the higher boiling constituents of the feed to form lower boiling constituents; and (4) Dehydrocyclization of paraffins to aromatics such as n-heptane to form toluene.

The fourth reaction is especially critical for obtaining high octane motor fuel.

Fixed bed hydroforming processes for conversion of naphtha may be divided into three general classes, namely, non-regenerative, semi-regenerative and cyclic. The instant process is applicable to any hydroforming system.

PRIOR ART

A great variety of catalysts may be used to hydroform a naphtha feed stream. Generally, hydroforming catalysts contain platinum or palladium dispersed upon an alumina support, such as is obtained from aluminum alcoholate.

U.S. Pat. 2,911,357 teaches a means for preventing the loss of activity in a platinum-type catalyst. Patentee has discovered that the nature of the platinum tends to change from an amorphous form into large metallic crystals which have reduced catalytic activity. In order to stabilize these catalysts an alloy is formed between Group A metals, platinum, palladium and rhodium and Group B metals, cobalt, ruthenium, manganese, copper, silver and gold.

In U.S. Pat. 3,156,735 a process is taught wherein noble metal catalysts are utilized for the oxidative dehydrogenation of hydrocarbons. Various combinations of metals are suggested for use as the catalyst including iridium-gold impregnated on a support. It is, however, essential to patentee's invention that the surface area of the support be no more than 8 square meters per gram. Higher surface areas result in a conversion of the hydrocarbon charge to carbon dioxide. Additionally, an oxygen atmosphere must be maintained over the catalyst.

The purpose of naphtha reforming is to obtain a motor fuel of high octane. The octane number of a fuel is defined in terms of the standard scale in which isooctane is assigned a value of 100 and n-heptane a value of 0. Obtaining a value of 100 and higher has been extremely difficult with the traditional platinum on alumina catalysts which are most frequently used as hydroforming catalysts.

SUMMARY OF THE INVENTION

According to this invention, it has unexpectedly been found that an improved hydroformate which may have an octane value of over 100 is obtained if one contacts a naphtha, under reaction conditions and in the presence of a reducing gas such as hydrogen, with an iridium-gold catalyst impregnated on a support; the support must have a high surface area because it is needed to maintain high dispersion of the metal, and the support itself enters into certain steps in the reactions which occur in reforming. The higher the area, the greater the rates of these steps (e.g., the isomerization of olefin intermediates).

Preferred supports include high surface alumina which generally has a surface area of roughly 75 to 250 $m^2$/gram. In no event should a support be utilized which has a surface area of less than 30 $m.^2$/gram.

With more particularity, the instant invention relates to an improvement in the hydroforming process; especially, it relates to an increase in the production of aromatics and a corresponding decerase in the hydrogenolysis activity within the hydroforming process. Although iridium itself an alumina is an active catalyst for hydroforming, the incorporation of gold decreases the hydogenolysis (cracking) activity of the catalyst and hence improves the yield of product in the gasoline boiling range. Hydrogenolysis is the cleavage of a bond in an organic compound (in this case, a carbon-carbon bond) with the addition of a hydrogen atom to both ends of the cleavage.

The naphtha cut which is reformed by the instant invention may be obtained from any of the petroleum feed streams; a typical naphtha cut boils between about 80° F. and 450° F.

The contents of a typical naphtha feed stream are approximately as follows:

| | Vol. percent |
|---|---|
| Paraffins | 20–80 |
| Naphthene | 20–80 |
| Aromatics | 5–20 |

The preferred catalyst to be used in the instant invention comprises iridium-gold on a high surface area support. The catalyst may also contain halogen, e.g., as chloride or fluoride arising from the chemical used in the preparation of the catalyst or by a separate treatment of the catalyst with a stream containing a halogen or halogen compound. The relative make-up of catalyst would be about 0.05 to 2.0 wt. percent of iridium, 0.01 to 2.0 wt. percent of gold and about 92.0 to 99.9 wt. percent of support, preferably 0.1 to 1.0 wt. percent of iridium, 0.05 to 1.0 wt. percent of gold and 98.0 to 99.85 wt. percent of support.

With regard to the support it may generally be categorized as a high area, porous, refractory oxide which serves to maintain the metal component of the catalyst in a highly dispersed state. The support may also contribute a catalystic function of its own by catalyzing intermediate steps in some of the reactions. The acidity of the support is important in this regard.

Preferred supports are the inorganic refractory oxides such as alumina, silica or various combinations of alumina and silica which, in turn, may also contain small amounts of a halogen, boria or additional components designed to impart acidity to the catalystic composit. Other refractory oxides which are useful in the instant invention include zinc oxide, magnesia, zirconia and thoria, as well as a support which comprises two or more inorganic refractory oxides such as silica-magnesia, silica-alumina-magnesia and the previously mentioned silica-alumina.

Typical supports will have 75 to 400 m²/grams of surface area; as mentioned previously, it is essential that the support have at least 30 m.²/gm. surface area. Most preferred range for surface area of the suport is 75 to 200 m.²/gram. Should the support have a surface area lower than 30 m²/gram, the following result will ensue:

The overall catalytic activity would decrease significantly since (1) the part of the reaction catalyzed by the support will decrease in rate, and (2) the rate of loss of surface area of the metal component of the catalyst could become a significant problem.

The preferred reducing gas for the hydroforming reaction is hydrogen. However, the following substitute may be utilized: a hydrogen-hydrocarbon mixture rich in hydrogen, such as would be obtained as part of the effluent from the hydroforming system. The hydrogen rich gas would simply be recycled to the inlet of the reaction system.

The recycle rate of the reducing gas, hydrogen, is generally 1,000 to 12,000 s.c.f./bbl. preferably 2,000 to 10,000 s.c.f./bbl.

The catalyst may be prepared in several different ways: It is most preferred to prepare the catalyst by coimpregnation of the support with an aqueous solution of the mixed salts or acids of the metals. The impregnated support is then dried at a temperature of 212–230° F. and may then be calcined at a temperature of 900–1100° F. in air or an inert gas. The catalyst is next reduced at elevated temperature in hydrogen (600–1100° F.), usually in place in the reactor prior to reforming. For impregnation hydrates of chloroiridic acid ($H_2IrCl_6$) and gold chloride ($HAuCl_4$) may be used conveniently. Alternatively, the catalyst may be prepared by impregnating the metal salts separately onto the support.

With regard to the hydroforming reaction itself, several different activities are occurring simultaneously. Naphthenes are dehydrogenated to the corresponding aromatic hydrocarbons, normal paraffins are isomerized to branched-chain parffins and ring compounds are isomerized to other configurations. Additionally, higher boiling constituents are hydrocracked. Perhaps the single most difficult reaction to catalyze in the hydroforming sequence is the dehydrocyclization of paraffins to aromatics; a paraffin, such as normal heptane must be transformed into an aromatic constituent, i.e. toluene. The process of this invention is especially effective for the dehydrocyclization of paraffins to aromatics.

Any naphtha feed stream, boiling between 80° F. and 450° F., preferably 150 to 375° F., can be employed. The feed stream is contacted with the supported iridium-gold catalyst at a temperature of 800 to 1050° F., preferably 875 to 975° F. and most preferably 900 to 950° F. Pressure may vary from 0.5 to 50 atmospheres, preferably 3 to 35 atmospheres, and most preferably 10 to 30 atmospheres.

The feed stream is passed over the catalyst at space velocities of 0.1 to 25 w./hr./w., preferably 1.0 to 7.0 w./hr./w. Since the hydroforming reaction produces significant amounts of hydrogen, very little additional hydrogen is necessary. The reaction takes place in the vapor phase. A series of reactors operated adiabatically, with reheating between stages would commonly be employed. The reactors would be fabricated from steel ordinarily.

It is thought that the iridium-gold catalyst of the instant invention involves formation of a surface alloy; however, there is no intent to be bound by any particular theory with regard to the nature of the catalyst.

In a preferred embodiment of the instant invention a hydroforming catalyst is utilized which comprises 0.5 wt. percent iridium, 0.5 wt. percent gold on a support, which is alumina and comprises 98 to 99 wt. percent of the catalyst. A naphtha feed stream boiling between 200 and 325° F. is passed over the catalyst. Temperature over the catalyst is maintained at 900 to 950° F., and pressure is 10 to 30 atmospheres. The naphtha feed stream, in the vapor phase, is passed over the catalyst at a rate of 2 to 7 w./hr./w. The reducing gas utilized is hydrogen which is recycled at a rate of about 4000 to 6000 s.c.f. per barrel of feed. The Research Clear Octane Number of the product was 105 to 106 in terms of the scale previously defined (isooctane=100, n-heptane=0). This high octane product will, of course, find use as a motor fuel.

SPECIFIC EXAMPLES

Example 1

In this example a comparison was made between a standard platinum hydroforming catalyst and the iridium-gold catalyst. The platinum catalyst consisted of 0.6 wt. percent platinum on an alumina support; the iridium-gold catalyst comprises 0.5% iridium and 0.5% gold on an alumina support.

The runs for both catalysts were made under identical conditions: temperature of 940° F., pressure of 200 p.s.i.g., 6,000 s.c.f. of hydrogen per barrel of feed, and space velocity of feed, 6 w./hr./w. In both instances three grams of catalyst were maintained in a metal tube. The feed stream was a naphtha with the following characteristics: 200–325° F. Mixed Louisiana Naphtha with an API gravity of 56.5 at 76° F. and approximate composition of 45% paraffins, 40% naphthenes, and 15% aromatics (by volume).

The naphtha was passed over the catalyst, in both cases, for a period of four hours. The results achieved are listed in Table 1.

TABLE 1

| Catalyst | Research Octane Number | Yield of liquid product, vol. percent | Estimated Yield [1] |
|---|---|---|---|
| CK 306 (0.6% Pt) | 99 | 77 | 72 |
| 0.5% Ir, 0.5% Au | 105–106 | 72 | 72 |

[1] At 105 Research Octane No., vol. percent.

The difference between 99 and 105 Research Octane Number corresponds to a difference in catalytic activity of approximately threefold.

What is claimed is:

1. A process for hydroforming a naphtha feed stream which comprises contacting said feed stream under hydroforming conditions in the presence of hydrogen with a catalyst, said catalyst consisting essentially of 0.1–2.0 wt. percent of iridium and 0.05–2.0 wt. percent of a metal selected from the group consisting of gold, silver or copper, on a high surface area support.

2. The process of claim 1 wherein said catalyst is iridium-gold.

3. The process of claim 2 wherein said support has a surface area of at least 30 M²/gram.

4. The process of claim 2 wherein said naphtha has a boiling range between 80 and 450° F.

5. The process of claim 2 wherein said contacting takes place at a temperature of 800 to 1050° F.

6. The process of claim 2 wherein said reducing gas is hydrogen.

7. A process for hydroforming a naphtha feed stream which comprises contacting said naphtha under hydroforming conditions, and in the presence of hydrogen with a catalyst, said catalyst consisting essentially of 0.1–2.0 wt. percent of iridium and 0.05–2.0 wt. percent of gold on a high surface area support, said support selected from the group consisting of silica, alumina and mixtures thereof and recovering a hydroformed naphtha product.

8. The process of claim 7 wherein said support is alumina.

9. The process of claim 7 wherein said naphtha has a boiling range of 80 to 450° F.

10. The process of claim 7 wherein the reaction takes place at a pressure of 10 to 30 atmospheres.

11. The process of claim 7 wherein the naphtha feed stream is passed over the catalyst at a rate of 1.0 to 7.0 w./hr./w.

12. The process of claim 7 wherein hydrogen is passed over the catalyst at the rate of 2,000 to 10,000 s.c.f./bbl. of feed stream.

References Cited

UNITED STATES PATENTS

| | | | |
|---|---|---|---|
| 2,739,946 | 3/1956 | Seeyer et al. | 252—466 |
| 2,848,377 | 8/1958 | Webb | 208—138 |
| 2,911,357 | 11/1959 | Myers et al. | 208—138 |
| 3,193,349 | 7/1965 | Mooi | 208—138 |
| 3,258,420 | 6/1966 | Dalson et al. | 208—138 |

HERBERT LEVINE, Primary Examiner

U.S. Cl. X.R.

208—139; 252—460, 466